United States Patent Office 3,728,237
Patented Apr. 17, 1973

3,729,237
METHOD OF MANUFACTURING ALUMINUM ELECTRODE FOIL FOR ELECTROLYTIC CAPACITORS
Martinus Gerard Jens Heijenbrok and Arend Van Herwijnen, Zwolle, Netherlands, assignors to U.S. Philips Corporation, New York, N.Y.
No Drawing. Continuation-in-part of application Ser. No. 56,051, June 24, 1970, which is a continuation of application Ser. No. 670,789, Sept. 26, 1967, both now abandoned. This application July 16, 1971, Ser. No. 163,471
Claims priority, application Netherlands, Sept. 27, 1966, 6613586
Int. Cl. C23b 1/00, 3/02
U.S. Cl. 204—129.75                              4 Claims

ABSTRACT OF THE DISCLOSURE

Improvement in etching of aluminum foil for electrolytic capacitors wherein ammonium persulfate, tartaric acid or a soluble tartrate is added to the etching solution.

---

This application is a continuation-in-part of our copending application Ser. No. 56,051, filed June 24, 1970, and now abandoned, which was a continuation of application Ser. No. 670,789, Sept. 26, 1967, and now abandoned.

This invention relates to a method of manufacturing aluminum electrode foil having an enlarged effective surface for use in electrolytic capacitors.

In order to enlarge the effective surface, aluminum is etched electrolytically. The resultant capacitive surface enlargement also depends upon the forming voltage. Generally a chloride-containing aqueous solution, for example, a sodium chloride solution, is used as the electrolyte solution. In general when used at lower forming voltages (for example, 10 volt) a larger effective surface enlargement manifests itself than when using higher forming voltages (for example, 100 volt).

It is known that an addition of chromic acid, a chromate or a bichromate in a quantity of at least 1% by weight as $CrO_3$ to an electrolyte solution produces for such an etching process an enlargement of the effective surface which, at least at low forming voltages, for example, 10 to 40 volt, is from 40 to 50% more than the enlargement obtained without said addition. In such an etching electrolyte solution the pH is kept at a value between 3 and 3.5, preferably with sulphuric acid. Since the mechanical strength, notably the impact strength, of the foil etched in said solution tends to decrease towards lower values, etching is preferably carried out with a supplied electric charge between 2500 and 4500 Coulombs per sq. dm. instead of with the commonly used value of 5500 Coulombs/sq. dm. or higher, as a result of which values of the impact strength are obtained which are amply sufficient for practical purposes. The foil thickness associated with desired Coulomb values in this case is 100 microns.

According to another known method larger capacitive surface enlargements are likewise obtained than with the method in which no additional substances are added to the electrolyte solution. For this purpose agents are added to the commonly used electrolyte solution, notably anions, for example, borate-, phosphate-, oxalate-, nitrate- and citrate ions.

Finally, it is known to add sulphates to an aqueous solution of sodium chloride to be used in the electrolytic etching of aluminum foil.

The invention provides a method of manufacturing aluminum electrode foil with the use of electrolytic etching as a result of which still a larger capacitive surface enlargement is obtained also at higher forming voltages (for example, 100 to 200 volt) than with any known method, namely a capacitive surface enlargement which may be more than 50% higher than in the method in which the foil is etched without any extra addition to the electrolyte solution.

The method according to the invention is characterized in that ammonium persulphate in a quantity between 0.5 and 20 grams per litre of etching electrolyte solution at a value of the pH between 2 and 5 is added to the etching electrolyte solution, or tartaric acid or soluble tartrates in a quantity of from 20 grams to 200 grams per litre of etching solution at a pH value between 1 and 5.

It has been found that optimum results in regard to surface enlargement of the aluminum and the tan $\delta$ (loss factor) of the resultant capacitor are achieved when 10 g./l. to 20 g./l. of the ammonium persulfate and 50 g./l. to 200 g./l. of the tartaric acid or soluble tartrate is employed.

As in the known method according to which $CrO_3$ is used in the etching liquid, the addition according to the invention results in a reduced mechanical strength of the resulting foil. Therefore, according to the invention also, a preferred embodiment of the method consists in using a decreased quantity of electric charge as compared with the normal quantity. This results in an increase of the tensile strength of the resulting foil so that it is sufficiently strong for practical uses also in the case of forming mechanically and continuously.

It has surprisingly been found that the ammonium ion in addition to the persulphate is essential in the etching liquid used according to the invention. If the ammonium is replaced by sodium or potassium, an enlargement of the effective surface is obtained, it is true, as compared with etching in an electrolyte without addition, but this enlargement does not exceed the average surface enlargement obtained with the known additions.

Finally, it has been found that the use of foil which was treated thermally prior to etching by heating at a temperature above 200° C., and preferably above 525° C. but below the melting point of aluminum, produces a further increase of the mechanical strength without the capacity-increasing effect being lost as a result. The said treatment is known per se.

In order that the invention may readily be carried into effect it will now be described in greater detail, by way of example, with reference to the following specific examples.

EXAMPLE 1

Hard aluminum foil, 80 microns thickness, purity 99.98% was electrochemically etched in a solution of sodium chloride in water in a concentration of 270 g./l. to which in addition the substances stated in Table I below were added in various quantities. The supplied electric charge was 4500 Coulomb/sq. dm. (effective surface). The thus etched foil was formed at 50 volts in a normal glycol-boric acid-ammonia electrolyte after which the capacity in the same electrolyte was measured with a platinum-plated silver reaction vessel as the opposite electrode. The resulting capacities are shown in percent compared with those of foil etched in the same manner in the same etching electrolyte but without additions which is assumed to be 100%.

TABLE I

| Addition, quantity, percent by weight | $(NH_4)_2S_2O_8$ | $(NH_4)_2SO_4$ | $H_2SO_4$ | $Na_2SO_4$ | $NaHSO_4$ | $Na_2S_2O_8$ | $Na_2SO_3$ | Citric acid |
|---|---|---|---|---|---|---|---|---|
| 0.1 | 126 | 114 | 122 | 110 |  | 114 | 112 | 101 |
| 0.2 | 133 | 124 | 127 | 111 |  | 120 | 118 | 103 |
| 0.5 | 145 | 132 | 138 | 122 | 122 | 123 |  |  |
| 1 | 151 | 137 |  | 125 |  |  |  | 111 |

EXAMPLE 2

Hard aluminum foil, 80 microns thickness purity 99.98% was etched in the same manner as in Example 1 in a solution of sodium chloride in water in a concentration of 270 g./l. without further addition and with an addition of 1% by weight of $(NH_4)_2S_2O_8$. The electric charge which normally is 4500 Coulomb/sq. dm. (effective surface) was reduced to 4000 and 3500 Coulomb/sq. dm. respectively. Of the thus etched foil the capacity was determined in the same manner as in the preceding example at 500 volts and the tensile strength of 10 mms. wide strips, which measurements are stated in Table II below. The capacity values are stated in $\mu f./$sq. cm. of projected surface.

TABLE II

| Etching charge, Coul./sq. dm. | Capacity at 50 v. ($\mu F./cm.^2$) | | Tensile strength (kg./mm.$^2$) | |
|---|---|---|---|---|
|  | Without addition | 1% $(NH_4)_2S_2O_8$ | Without addition | 1% $(NH_4)_2S_2O_8$ |
| 4,500 | 7.8 | 11.8 | 1.1 | 0.8 |
| 4,000 | 7.3 | 10.0 |  | 1.05 |
| 3,500 | 6.3 | 8.9 |  | 1.2 |

EXAMPLE 3

In the same manner as in Example 1 aluminum foil, 80 microns thickness, purity 99.98% was etched in a solution of sodium chloride, in water in a concentration of 270 g./l. to which 1% by weight of $(NH_4)_2S_2O_8$ was added. The foil was then formed and measured as in Example 1 but at different forming voltages. Table III below states for the various forming voltages the capacity in percent with respect to the capacity of the same foil which was etched in the same electrolyte liquid but without any addition, which capacity, at every relative forming voltage, is assumed to be 100%.

TABLE III

| Forming voltage (volts): | Capacity (percent) |
|---|---|
| 6 | 160 |
| 50 | 150 |
| 90 | 143 |
| 130 | 136 |
| 190 | 127 |
| 250 | 125 |

EXAMPLE 4

Hard aluminum foil, purity 99.98%, was etched in a manner similar to that described in the preceding examples with a supplied electric charge of 4500 Coulomb/sq. dm. (effective surface) in a solution of sodium chloride in water in a concentration of 270 g./l. without further addition and an addition of 75 gms. of tartaric acid per litre of etching liquid. After etching the tensile strength and the impact strength were measured of 15 mms. wide strips of the foil. The foil was measured in a manner similar to that of the preceding example at different forming voltages, after which the capacity per sq. cm. (projected surface) was measured. Table IV shows the measured results.

TABLE IV

| Addition | Capacity ($\mu F./cm.^2$) at— | | | | Tensile strength (kg./sq. mm.) | Impact strength (cm./kg.) |
|---|---|---|---|---|---|---|
|  | 6 v. | 50 v. | 90 v. | 240 v. | | |
| None | 66 | 7.3 | 2.9 | 0.48 | 1.55 | 0.4 |
| Tartaric acid | 128 | 11.0 | 4.0 | 0.55 | 1.25 | 0.1 |

EXAMPLE 5

Aluminum foil, purity 99.98%, 100 microns thickness, was annealed in 2 lots, namely at 300° C. for 16 hours and at 500° C. for 4 hours. Both lots of foil were then etched electrochemically in the same manner as in the preceding examples but with a supplied electric charge of 6000 Coulomb/sq. dm. (effective surface) in connection with the thickness of 100 microns, in a solution of sodium chloride in water in a concentration of 270 g./l. without further addition and with an addition of 75 gms. of tartaric acid per litre of etching electrolyte liquid. After etching all the resulting foil was formed at different voltages as in the preceding examples and the capacity was determined per sq. cm. of projected surface.

TABLE V

| Annealing condition | Addition | Capacity ($\mu F./$sq. cm.) at— | | | |
|---|---|---|---|---|---|
|  |  | 6 v. | 50 v. | 90 v. | 240 v. |
| 16 hours at 300°C | None | 33 | 4.0 | 1.9 | 0.38 |
|  | Tartaric acid | 99 | 8.8 | 3.4 | 0.53 |
| 4 hours at 550 C | None |  | 5.4 |  | 0.45 |
|  | Tartaric acid |  | 9.1 |  | 0.51 |

If after etching the foil is re-annealed at high temperature, the capacity gain as a result of the addition of tartaric acid becomes more apparent at the higher forming voltages which is stated in the table below. Re-annealing is effected for 15 minutes in an air circulation furnace. The effects found are dependent upon the starting material as appears from the table. In this table the capacity is indicated in percent as compared with foil etched in a 270 g./l. sodium chloride solution without addition and formed at the same voltage.

TABLE VI

| Pre-annealing conditions | Re-annealing | Capacity in percent at— | | | | |
|---|---|---|---|---|---|---|
|  |  | 6 v. | 50 v. | 90 v. | 240 v. | 400 v. |
| Not | Not | 195 | 150 | 138 | 115 |  |
|  | 15 min. at 500° C | 190 | 150 | 140 | 130 | 125 |
| 16 hours at 300° C | Not | 300 | 220 | 180 | 140 |  |
|  | 15 min. at 500° C | 250 | 185 | 175 | 145 |  |
| 4 hours at 550° C | Not |  | 160 |  | 115 |  |
|  | 15 min. at 550° C |  | 160 |  | 140 | 160 |

The range of sodium chloride or other alkali metal halides such as potassium bromide or sodium bromide in the etching solutions may range from about 1 to 5 molair.

We claim:

1. A method of manufacturing an aluminum electrode foil having an enlarged effective surface for use in electrolytic capacitors which method comprises electrolytically etching said aluminum foil in an aqueous solution of sodium chloride and an additive selected from the group consisting of ammonium persulfate in an amount of 0.5 to 20 grams per liter of etching solution having a pH between 2 and 5 and tartaric acid and a soluble tartrate in an amount of at least 20 grams per litre of the etching solution having a pH between 1 and 5.

2. The method of claim 1, wherein a quantity of electric charge between 2500 and 4500 Coulomb/sq. dm. is used for a foil of 80 microns thickness and a charge of 4000–6000 Coulomb/sq. dm. of effective surface for a foil of 100 microns thickness is applied.

3. The method of claim 1 wherein the starting material is aluminum foil which is treated thermally by heating at a temperature between 525° C. and the melting point of aluminum.

4. Electrode foil for use in an electrolytic capacitor obtained by claim 1.

References Cited

UNITED STATES PATENTS

| 3,316,164 | 4/1967 | Welch, Jr. | 204—141 |
| 3,281,293 | 10/1966 | Woodring | 156—22 |

FOREIGN PATENTS

| 963,365 | 7/1964 | Great Britain | 204—141 |
| 835,091 | 5/1960 | Great Britain | 204—141 |
| 970,572 | 9/1964 | Great Britain | 204—141 |

JOHN H. MACK, Primary Examiner

T. TUFARIELLO, Assistant Examiner

U.S. Cl. X.R.

204—129.95